United States Patent [19]

Sonzogni

[11] 4,424,879
[45] Jan. 10, 1984

[54] WHEEL-HUB WITH AN EPICYCLIC REDUCTION GEAR, ESPECIALLY FOR THE FRONT AXLE OF AGRICULTURAL TRACTORS

[75] Inventor: Franco Sonzogni, Canonica D'Adda, Italy

[73] Assignee: SAME S.p.A., Italy

[21] Appl. No.: 269,280

[22] Filed: Jun. 1, 1981

[30] Foreign Application Priority Data

Jun. 6, 1980 [IT] Italy ............................ 21989/80[U]

[51] Int. Cl.³ .......................................... B60K 17/04
[52] U.S. Cl. .................................... 180/255; 74/391; 74/785
[58] Field of Search ............... 180/254, 255, 10, 6.2, 180/73 C, 73 D; 74/750 R, 391, 785

[56] References Cited

U.S. PATENT DOCUMENTS 4,291,779  9/1981  Mann et al. ........................ 74/391

Primary Examiner—John A. Pekar
Assistant Examiner—D. Lynn Fugate
Attorney, Agent, or Firm—Stevens, Davis, Miller & Mosher

[57] ABSTRACT

A wheel hub with an epicyclic reducing gear is disclosed, which essentially comprises a bottom section in the form of a cup which is bolted to an intermediate belt like section having a ring gear formed in its inner periphery, a planetary gear carrier carrying gears which mesh with the ring gear and the pinion.

The carrier is divided into two sections assembled by bolts. Running races for bearing balls are complementarily formed on the beltlike section and on the complementary sections of the carrier.

4 Claims, 1 Drawing Figure

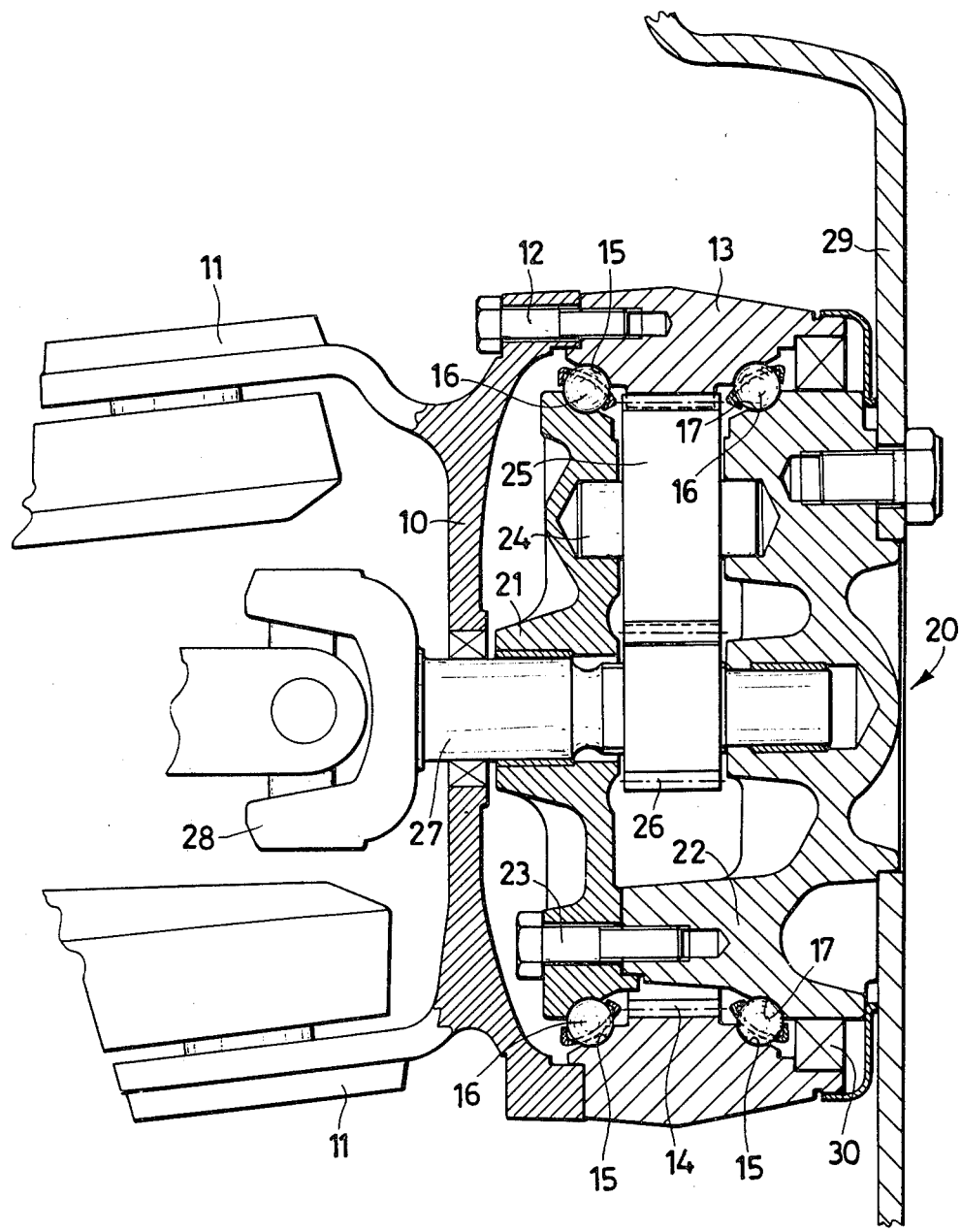

WHEEL-HUB WITH AN EPICYCLIC REDUCTION GEAR, ESPECIALLY FOR THE FRONT AXLE OF AGRICULTURAL TRACTORS

It is known long since in the construction of tractors to mount a final reducing gear of epicyclic type in the hub of motive wheels.

One of the principal prerequisites which are required of such a hub is that it has a limited bulk so as to be able to be housed within the wheel circle without being a restriction for the steering angle of the wheels.

This requirement of reduced size conflicts with considerable difficulties in design which are also originated by the high loads such a hub must undergo in the kind of vehicles referred to above.

A requirement is, for example, a large sizing of the rolling bearings which bear the output shaft, that is, of the bearings which are inserted between the reducing gearbox, to which the ring gear of the epicyclic train is secured, and the planet gear carried to which the wheel is to be fastened.

The invention thus aims at simplifying the structure of the reducing hub both in connection with the configuration of the component parts and in connection with the number of said component parts.

More particularly, this invention aims at providing a wheel hub with an epicyclic reduction gear, comprising a first bottom section of the outer box which is intended to be secured to the vehicle suspensions and to which is fastened an annular beltlike section in the interior of which a ring gear is formed which meshes with planetary gears carried by a rotary set in the centre of which the pinion of the input shaft is received, peripherally to the planet carrier there being formed two races which confine the seating for two rows of balls with complementary races formed laterally of said ring gear on said annular section of the outer box.

The essential constructional features of the invention will appear more clearly from the ensuing description of a practical embodiment illustrated in the accompanying drawing, the single FIGURE of which shows a diagrammatical axial cross-sectional view of a wheel hub according to this invention.

As shown in the drawing, the wheel hub comprises a first bottom section 10, which is terminated by a two-eyed fork 11, the eyes defining an articulation to the vehicle suspension system, that is, to the rigid box of the axle according to a conventional layout in tractors.

To the section 10 there is secured by bolts at 12 an annular section 13, in which there is formed a ring gear 14 and, at the side of same, two races 15 for two ball rows 16, with their spacer cages, the balls rolling in turn in races 17 of the planetary gear carrier, the latter being generally indicated at 20.

The carrier 20 is split into two sections, an annular one 21 and a disc-like one 22, secured to one another by bolts 23, pins 24 being inserted for the rotation of the planetary gears 25: these mesh both with the ring gear 14 and the pinion 26 carried by the input shaft 27.

The shaft 27 is connected to the corresponding axle by appropriate articulated linkages, a portion of which is shown at 28.

To the front surface of the section 22 of the carrier 20 the disk of the vehicle wheel shall be fastened, and is partially shown at 29.

Between the carrier 20 and the wheel-hub box, a sealing ring shown at 30 is inserted.

The arrangement suggested by this invention affords conspicuous advantages for the technicians. The unit has a cost which is considerably reduced as compared with the conventional makes, the inner and the outer rings of the rolling bearings, being dispensed with, irrespective of the fact that ball bearings or tapered roller bearings are adopted. The races 15 and 17 are, according to the invention, formed directly on the component parts of the unit: these parts are made, with advantage, with carbon-alloyed steel and, in correspondence with the races, the material can be hardened superficially by an induction thermal treatment.

A not negligible advantage stemming from the constructional layout according to this invention is the ready accessibility of the sealing ring 30 for replacement purposes.

The foregoing disclosure has shown an exemplary embodiment of the invention and should not be construed as a limitation for the modifications and changes any technician may introduce to what has been shown to explain the basic principles of this invention.

I claim:

1. A wheel-hub with an epicyclic reduction gear, comprising a first bottom section of an outer box which is intended to be secured to vehicle suspensions, and to which is fastened an annular section in the interior of which a ring gear is formed which meshes with planetary gears carried by a rotary set in the centre of which a pinion of an input shaft is received, peripherally to the planet carrier there being formed directly thereon two races which confine the seating for two rows of balls with complementary races formed laterally of said ring gear and directly on said annular section of the outer box.

2. A wheel-hub according to claim 1, characterized in that said planet carrier set is formed by an annular portion and a disc portion connected by bolts to one another.

3. A wheel-hub according to claim 1, characterized in that said annular section of the outer box and said planet carrier set are made of carbon steel subjected to hardening in correspondence with said races.

4. A wheel-hub according to claim 1, characterized in that between said planet carrier set and an outer edge of said annular section of the box a sealing ring is inserted.

* * * * *